US010762204B2

(12) United States Patent
Yuen et al.

(10) Patent No.: US 10,762,204 B2
(45) Date of Patent: Sep. 1, 2020

(54) MANAGING CONTAINERIZED APPLICATIONS

(71) Applicant: BlackBerry Limited, Waterloo (CA)

(72) Inventors: Chun Fung Yuen, Mississauga (CA); Alex Lau, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 470 days.

(21) Appl. No.: 15/039,976

(22) PCT Filed: Nov. 26, 2014

(86) PCT No.: PCT/US2014/067694
§ 371 (c)(1),
(2) Date: May 27, 2016

(87) PCT Pub. No.: WO2015/081249
PCT Pub. Date: Jun. 4, 2015

(65) Prior Publication Data
US 2018/0203995 A1    Jul. 19, 2018

Related U.S. Application Data

(63) Continuation of application No. 14/093,005, filed on Nov. 28, 2013, now Pat. No. 9,361,163.

(51) Int. Cl.
*G06F 21/53*     (2013.01)
*G06F 21/55*     (2013.01)
(Continued)

(52) U.S. Cl.
CPC ............ *G06F 21/556* (2013.01); *G06F 9/455* (2013.01); *G06F 9/54* (2013.01); *G06F 9/544* (2013.01); *G06F 21/51* (2013.01); *G06F 21/53* (2013.01)

(58) Field of Classification Search
CPC ........ G06F 21/556; G06F 9/455; G06F 9/544; G06F 9/54; G06F 21/53
See application file for complete search history.

(56) References Cited

U.S. PATENT DOCUMENTS 5,907,704 A * 5/1999 Gudmundson ...... G11B 27/034
717/100
6,757,904 B1 * 6/2004 Woodruff ............ G06F 9/45533
719/319

(Continued)

FOREIGN PATENT DOCUMENTS

WO    WO 2006/010263    2/2006

OTHER PUBLICATIONS

Bugiel et al., "Practical and lightweight domain isolation on Android," Proceedings of the 1st ACM workshop on Security and privacy in smartphones and mobile devices (SPSM '11 ), Oct. 17, 2011; 12 pages.

(Continued)

*Primary Examiner* — Matthew T Henning
(74) *Attorney, Agent, or Firm* — Fish & Richardson P.C.

(57) ABSTRACT

A method of managing access to a plurality of applications capable of executing within a container provisioned on a computing device. The method comprises the steps of: receiving, at a first communications interface of the container, a first communication for execution by a first application in the plurality of applications capable of executing within the container, wherein the communication is received from an on-device process via a first communication pathway using an inter-process communication (IPC) framework provided by an operating system executing on the computing device; sending, from the first communications interface of the container, the communication to a second communications interface of the first application via a second communication pathway provided by the container, wherein the (Continued)

second communication pathway bypasses the IPC framework; receiving, at the first communications interface of the container, a response to the first communication from the second communications interface of the first application via the second communication pathway; and sending, the response from the first communications interface of the container to the on-device process via the first communication pathway.

18 Claims, 3 Drawing Sheets

(51) Int. Cl.
  *G06F 9/54* (2006.01)
  *G06F 9/455* (2018.01)
  *G06F 21/51* (2013.01)

(56) References Cited

U.S. PATENT DOCUMENTS

| | | | | |
|---|---|---|---|---|
| 9,391,826 | B1* | 7/2016 | Dayan | H04L 29/06 |
| 9,733,992 | B1* | 8/2017 | Poeluev | G06F 9/54 |
| 2003/0172088 | A1* | 9/2003 | Mandal | G06F 17/30067 |
| 2003/0221024 | A1 | 11/2003 | Arroyo et al. | |
| 2007/0094416 | A1* | 4/2007 | Goldstein | G06F 9/546 709/253 |
| 2009/0025009 | A1 | 1/2009 | Brunswig et al. | |
| 2009/0094617 | A1* | 4/2009 | Gruenewald | G06F 9/541 719/316 |
| 2009/0144510 | A1 | 6/2009 | Wibling | |
| 2009/0271840 | A1* | 10/2009 | Gillet | G06F 21/6209 726/1 |
| 2011/0010457 | A1* | 1/2011 | Tanttu | H04L 12/14 709/226 |
| 2011/0141124 | A1* | 6/2011 | Halls | G06F 21/83 345/522 |
| 2013/0174154 | A1 | 7/2013 | Poore et al. | |
| 2013/0239192 | A1 | 9/2013 | Linga | |
| 2014/0068779 | A1 | 3/2014 | Tan | |
| 2014/0137184 | A1 | 5/2014 | Russello | |
| 2014/0181896 | A1 | 6/2014 | Yablokov | |
| 2015/0347749 | A1* | 12/2015 | Kiehtreiber | G06F 21/53 726/26 |

OTHER PUBLICATIONS

Xu et al., "Aurasium: Practical Policy Enforcement for Andriod Applications," 21st Usenix Security Symposium, Aug. 8-10, 2012; pp. 1-14; <https://www.usenix.org/system/files/conference/usenixsecurity12/sec12-final60.pdf>.

Burns, "Mobile Application Security on Android," Black Hat USA 2009, pp. 1-27; <http://www.blackhat.com/presentations/bh-usa-09/BURNS/BHUSA09-Burns-AndroidSurgery-PAPER.pdf>.

Gray, "Interprocess Communications in Linux," Person Education Inc., 2003; pp. 165-193.

International Search Report and Written Opinion of the International Searching Authority issued in International Application No. PCT/US2014/067694 dated Feb. 20, 2015; 10 pages.

Communication Pursuant to Article 94(3) EPC issued in European Application No. 14819177.8 dated Oct. 31, 2018, 9 pages.

Summons to attend Oral Proceedings pursuant to Rule 115 (1) EPC issued in European Application No. 14819177.8 dated Feb. 11, 2020, 9 pages.

Wikipedia Contributors [Online], "OS-level virtualization" created on Sep. 26, 2005, [retrieved on Feb. 12, 2020], retrieved from: URL<https://en.wikipedia.org/w/index.php?title=OSlevel_virtualization&oldid=583315301>, 5 pages.

Gardezi et al., "Security in wireless cellular networks." Washington University in St. Louis, St. Louis, Apr. 23, 2006, 12 pages.

Summons to attend Oral Proceedings pursuant to Rule 115 (1) EPC issued in European Application No. 14819177.8 dated Jun. 8, 2020, 9 pages.

* cited by examiner

MANAGING CONTAINERIZED APPLICATIONS

CLAIM OF PRIORITY

This application is a U.S. National Stage of PCT/US2014/067694 filed on Nov. 26, 2014, which application claims priority to U.S. patent application Ser. No. 14/093,005 filed Nov. 28, 2013, the entire contents of which are hereby incorporated by reference.

BACKGROUND OF THE INVENTION

Field of the Invention

The present invention relates to mobile application management.

Description of the Related Technology

Exploitation of computing devices is an ever increasing problem in today's mobile workforce environment. Bring-your-own-device (BYOD) trends are accelerating in today's everything-mobile environment. One disadvantage for today's users is that they have to carry multiple devices to stay connected to every aspect of their lives. The advent of consumerization has led employees to demand a greater say in the devices, applications and carriers they use at work. They either tend to regard company-issued mobile phones as their own, or they are looking to bring personal devices into the workplace to help them manage their day—but few are prepared to juggle two separate handsets nowadays. IT departments are struggling to react to the pace of change that these new types of hardware and operating systems pose in the enterprise environment. Data security is a particular concern as currently devices are used interchangeably for private and professional purposes, without proper restrictions placed on data access both on and off the device. At the moment, the frontier between personal and business devices is blurred, while smart phones are increasingly used for work purposes.

More specifically, a growing number of employees are already using their own phones for work-related activities. According to Forrester, 60% of companies now allow their employees to use personal smart phones and tablets at work a trend known as BYOD—'Bring Your Own Device'. However, using the same device for work and private purposes may be problematic. For instance, using your business phone to store your personal contacts means that these may end up in the company's backup base, raising privacy concerns. Further, having company data on a personal device raises the likelihood that dissemination of the company data outside of company communication channels may occur.

Mobile Device Management (MDM) and Mobile Application Management (MAM) solutions are typically complicated by an increasing demand by users for BYOD. On one hand enterprises need to ensure that data are secured and under the control of the enterprise, but on the other hand the user wants to retain control of device data that are personal in nature. This see-saw battle gave rise to recent technological advances in the area of applying MAM to applications, often termed "containerization" or "sand boxing".

However, a major challenge in applying MAM to a "container" revolves around the interaction between applications and the Inter-Process Communication (IPC) subsystem of the mobile device platform. Ideally only interfaces that are (i) crucial to the functionality of application, and (ii) necessary for MAM should be exposed via the (IPC subsystem. These two requirements poses serious challenges and security risks. For example, allowing applications to expose application interfaces via the IPC subsystem introduces an attack vector whereby intruders can invoke the application interfaces for malicious purposes, possibly resulting in data leakage. The MAM component could theoretically intercept the calls at the IPC level, but this often requires direct hooks into the mobile platform which might not always be desired. Alternatively completely disabling the application interfaces of applications is not practical either some of them are crucial to the functionality of the application (e.g. ANDROID component's lifecycle events are invoked by the ANDROID Binder IPC subsystem).

SUMMARY

It is an object of the present invention to provide communication management between applications on a mobile device to obviate or mitigate at least one of the above-presented disadvantages.

Data security is a particular concern as currently devices are used interchangeably for private and professional purposes, without proper restrictions placed on data access both on and off the device. At the moment, the frontier between personal and business devices is blurred, while smart phones are increasingly used for work purposes. Contrary to present on-device security systems there is provided a method of on-device access using a container application (also termed simply a "container") to manage a sub application provisioned on a computer device by set of stored instructions executed by a computer processor to implement the steps of: receive a communication for the sub application by a first service programming interface (SPI) of the container application, the communication sent by an on-device process over a first communication pathway of a device infrastructure of the computer device utilizing inter-process communication (IPC) framework of the device infrastructure, the first communication pathway provided external to the first SPI; retransmit the communication by the first SPI to a second SPI of the sub application over a second communication pathway that bypasses the IPC framework, the second communication pathway internal to the first SPI; receive a response to the communication by the first SPU from the second SPI over the second communication pathway; and directing the response to the on-device process over the first communication pathway.

A first aspect provides a method of managing access to a plurality of applications capable of executing within a container provisioned on a computing device, the method comprising the steps of: receiving, at a first communications interface of the container, a first communication for execution by a first application in the plurality of applications capable of executing within the container, wherein the communication is received from an on-device process via a first communication pathway using an inter-process communication (IPC) framework provided by an operating system executing on the computing device; sending, from the first communications interface of the container, the communication to a second communications interface of the first application via a second communication pathway provided by the container, wherein the second communication pathway bypasses the IPC framework; receiving, at the first communications interface of the container, a response to the first communication from the second communications interface of the first application via the second communication pathway; and sending, the response from the first communications interface of the container to the on-device process via the first communication pathway.

According to some embodiments, the method further comprises the step of: receiving, at the first communications interface of the container, a second communication for the first application via the first communication pathway; and denying access to the first application by preventing receipt of the second communication by the second communications interface of the first application.

According to some embodiments, the on-device process is an application provisioned on the computing device. Similarly, according to some further embodiments the on-device process is a process associated with a hardware component of the computing device. The hardware component may be an external network connection interface of the computing device According to some embodiments, the method further comprises the steps of: using a first portion of the second communications interface of the first application to receive the communication via the second communication pathway; and using a second portion of the second communications interface of the first application to communicate with a second application in the plurality of applications capable of executing within the container via the second communication pathway; wherein the first portion of the second communications interface is provided for intra-container communication between the first communications interface and the second communications interface and the second portion of the second communications interface is provided for inter-application communication between the second communications interface and a respective communications interface of the second application.

According to some embodiments, the second communication pathway is implemented using a region of memory in a storage device of the computing device, wherein the region of memory is only accessible by the container and the plurality of applications capable of executing within the container.

According to some embodiments, the communication is a memory based message thread.

According to some embodiments, the method further comprises the steps of: receiving, at the first communications interface of the container, a control communication via the first communication pathway; sending the control communication from the first communications interface of the container to a policy engine component of the container via the second communication pathway; and sending a control command from the policy engine component of the container to the first application via the second communication pathway, wherein the control command is based on the control communication received by the policy engine and is configured to control execution of the first application.

According to some embodiments, the policy engine component of the container is provided by the first communications interface.

According to some embodiments, the method further comprises the steps of: receiving a launch command at the first communications interface via the first communication pathway, wherein the launch command is a command to launch a specified service; send the launch command from the first communications interface to a launch component of the container via the second communication pathway; determining, at the launch component, a second application in the plurality of applications capable of executing within the container which is configured to provide the specified service; and sending the launch command to the second application via the second communication pathway.

According to some embodiments, the first application is configured as a library project of the container. The library project may be a JAVA library.

According to some embodiments, the first and second communications interfaces are service programming interfaces.

A second aspect provides a method of managing access to a plurality of applications capable of executing within a container provisioned on a computing device, the method comprising: receiving, at a control component of the container, a first communication for a first application in the plurality of applications capable of executing within the container, wherein the first communication is received via a first communications pathway implemented by the container; determining, at the control component of the container, and based on an event mapping, whether the first communication relates to a permitted event in respect of the first application; transmitting the first communication from the control component to the first application over a second communication pathway implemented by the container when it is determined that the first communication relates to a permitted event in respect of the first application.

According to some embodiments, the first communication is received at the control component from a second application in the plurality of application executing within the container.

According to some embodiments, the first communication is received at the control component from a communications interface associated with the container, wherein the communications interface is configured to interface with an inter-process communications framework provided by an operating system executing on the computing device.

According to some embodiments, the first communications pathway and the second communications pathway is implemented using a region of protected memory in a storage device of the computing device which is allocated to the first container by an operating system running on the computing device.

A third aspect provides a non-transitory computer-readable storage medium comprising computer-executable instructions which, when executed by a processor, cause a computing device to perform a method of managing access to a plurality of applications capable of executing within a container provisioned on a computing device, the method comprising: receiving, at a first communications interface of the container, a first communication for execution by a first application in the plurality of applications capable of executing within the container, wherein the communication is received from an on-device process via a first communication pathway using an inter-process communication (IPC) framework provided by an operating system executing on the computing device; sending, from the first communications interface of the container, the communication to a second communications interface of the first application via a second communication pathway provided by the container, wherein the second communication pathway bypasses the IPC framework; receiving, at the first communications interface of the container, a response to the first communication from the second communications interface of the first application via the second communication pathway; and sending, the response from the first communications interface of the container to the on-device process via the first communication pathway.

A fourth aspect provides a non-transitory computer-readable storage medium comprising computer-executable instructions which, when executed by a processor, cause a computing device to perform a method of method of managing access to a plurality of applications capable of executing within a container provisioned on a computing device, the method comprising: receiving, at a control component of the container, a first communication for a first application in the plurality of applications capable of executing within the container, wherein the first communication is received via a first communications pathway implemented by the container; determining, at the control component of the container, and based on an event mapping, whether the first communication relates to a permitted event in respect of the first application; transmitting the first communication from the control component to the first application over a second communication pathway implemented by the container when it is determined that the first communication relates to a permitted event in respect of the first application.

A further aspect provides a method of on-device access using a container application to manage a sub application provisioned on a computer device by set of stored instructions executed by a computer processor to implement the steps of: receive a communication for the sub application by a first service programming interface (SPI) of the container application, the communication sent by an on-device process over a first communication pathway of a device infrastructure of the computer device utilizing inter-process communication (IPC) framework of the device infrastructure, the first communication pathway provided external to the first SPI; retransmit the communication by the first SPI to a second SPI of the sub application over a second communication pathway that bypasses the IPC framework, the second communication pathway internal to the first SPI; receive a response to the communication by the first SPU from the second SPI over the second communication pathway; and direct the response to the on-device process over the first communication pathway.

BRIEF DESCRIPTION OF THE DRAWINGS

The foregoing and other aspects will be more readily appreciated having reference to the drawings, wherein.

DETAILED DESCRIPTION OF CERTAIN INVENTIVE EMBODIMENTS

The claimed invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques.

In general, the order of the steps of disclosed processes may be altered within the scope of the claimed invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the claimed invention is provided below along with accompanying figures that illustrate the principles of the invention. The claimed invention is described in connection with such embodiments, but the claimed invention is not limited to any embodiment. The scope of the claimed invention is limited only by the claims and the claimed invention encompasses numerous alternatives, modifications and equivalents. Numerous specific details are set forth in the following description in order to provide a thorough understanding of the claimed invention. These details are provided for the purpose of example and the invention may be practiced according to the claims without some or all of these specific details. For the purpose of clarity, technical material that is known in the technical fields related to the claimed invention has not been described in detail so that the claimed invention is not unnecessarily obscured.

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1:
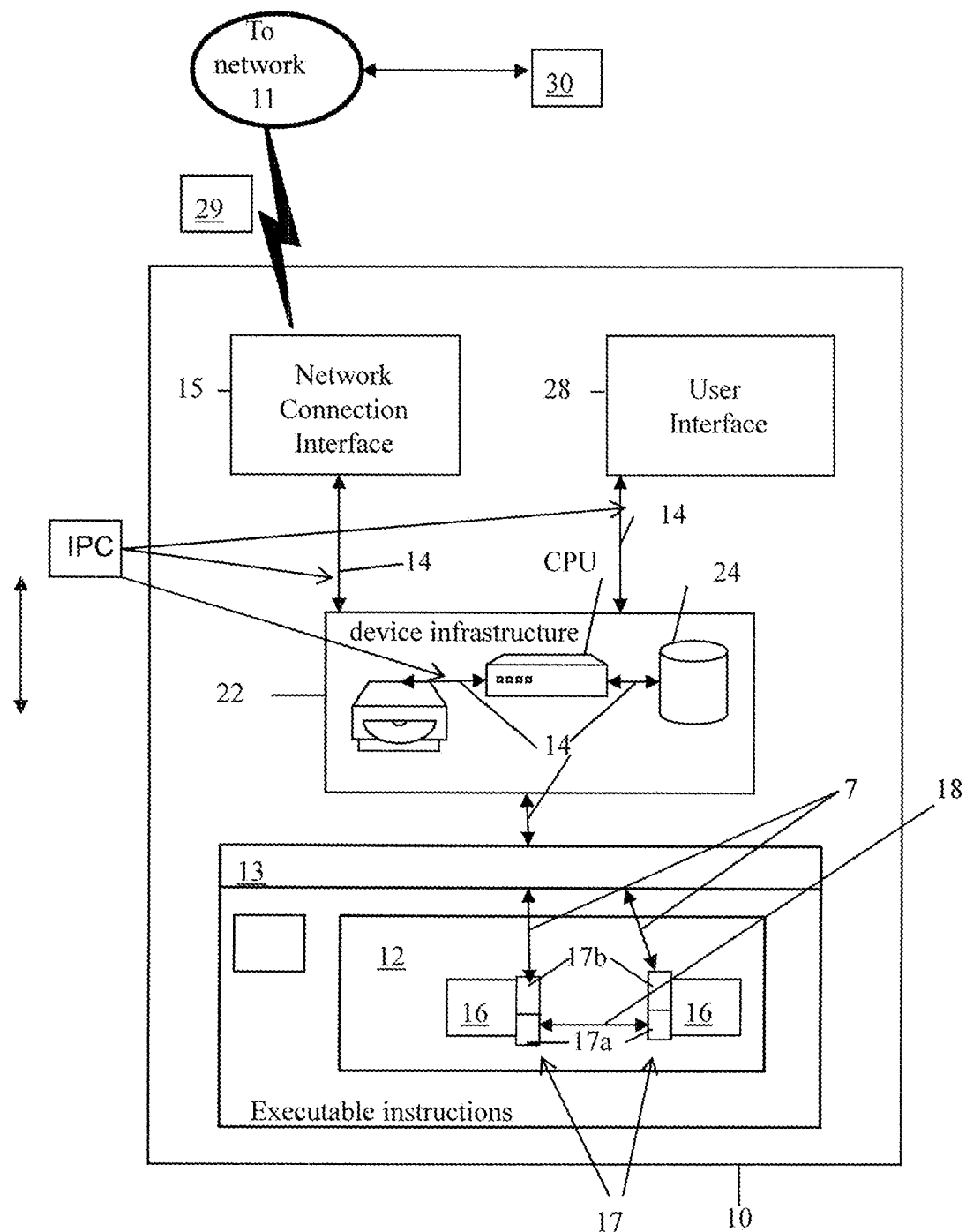
FIG. 1 shows an example configuration of a device.

Referring to FIG. 1, the following relates to a system for management of containerized applications 16 which are capable of execution within a container application 12 provisioned on a computer device 10 (e.g. mobile device), such that the containerized applications 16 (also referred to as sub-applications) are managed by the container application 12. In this context, the containerized application 16 may be considered as applications which are capable of execution within the container application 12 (i.e. within the workspace associated with the container application 12). The container application 12 provides for intercommunication (e.g. communication request-and-response pairs) between the containerized applications 16, while at the same time restricting access to the containerized applications 16 by inter-process communication (IPC) functionality provided by the computer device infrastructure 22 (also referred to as computer device platform or computer device IPC framework). The container application 12 is also configured to control access from the containerized applications 16 to the computer device IPC framework 22, such that respective service programming interfaces 17 (see FIG. 3) of each of the containerized applications 16 is arranged to communicate with the computer device IPC framework 22 via an intervening or intermediate service programming interface 13 of the container application 12.

A client (or consumer) application 12, 16 is an application or a process that requests a service from some other application or process. A service application 12, 16 is an application or a process that responds to a client (or consumer) application 12, 16 request. Many applications 12, 16 can act as both a client application and a service application, depending on the situation. As such, intercommunication between the applications 12, 16 and/or between the applications 12 and the on-board devices (e.g. user interface 28) is performed via respective service programming interfaces 13, 17.

In one example, the service programming interface 17 of each containerized application 16 has a first interface portion 17a for facilitating direct communication between containerized applications 16 within the container application 12 (i.e. between respective service programming interfaces 17 of containerized applications 16 in the container application 12), such that the communication path 18 for these direct communications bypasses the inter-process communication (IPC) path 14 provided by an operating system of the mobile device platform 22, and is such logically positioned behind the service programming interface 13. In this manner, the container application 12 is configured to provide an intra-container communication framework for direct communications between the containerized applications 16. A second interface portion 17b of the service programming interface 17 is for facilitating communication (e.g. communication request-and-response pairs) between the containerized applications 16 and the IPC paths 14 of the mobile device platform 22, as first received and then retransmitted via the intermediate service programming interface 13 of the container applications 12.

According to the example configuration described above, the communication pathways 14 external to the service programming interface 13 and communication pathways 18 internal to service programming interface 13 are all configured using computer hardware (e.g. short term memory 24 such as memory buffers, longer term memory such as drive memory, etc.) and are considered as being "on-board" the computer device 10. As such, any communications 29 communicated between the network interface 15 (e.g. USB port or other communication channel) and any connected device 30 on the network 11 are considered communications that occur "off device" and as such are not considered to be communications communicated via pathways 14 that are provided on device by the device infrastructure 22. In other words, communications are not considered to be on the pathways 14 provided by the device infrastructure 22 until the communications are received by the network connection interface 15 and then retransmitted locally on-device using physical and/or logical connections provided by pathways 14 between device components (e.g. network interface 15, user interface 28, general memory 24) and container applications 16.

In the present context, communications (e.g. communication request-and-response pairs) in general (e.g. on pathways 18) may refer to accessing Data at Rest (DAR) referring to inactive data which is stored physically in any digital form on the computer device 10, for example associated with a particular containerized application 16. A typical example of DAR is archive data which typically does not or rarely changes, regardless of its storage medium. Other communications types can be Data in Use (DIU) or Data in Transit (DIT). A typical example of DIU is data which is subject to constant or frequent change. In further examples, DIU may refer to data that is in the process of being created, retrieved, updated, deleted, and/or otherwise manipulated. Similarly, DIU may refer to data that is not in an at-rest state and that resides on or otherwise is in process with respect to one or more devices and/or applications (e.g. container applications 12) of the device infrastructure 22. DIU can be one aspect of a Data Loss Prevention (DLP) system. Such data can be regarded as secure if access to the memory in which the data is stored is controlled and the data cannot be retrieved from any other location. It is recognized that DAR or DIU/DIT can refer to data being communicated/accessed via pathways 14 and/or via pathways 18.

Figure 3:
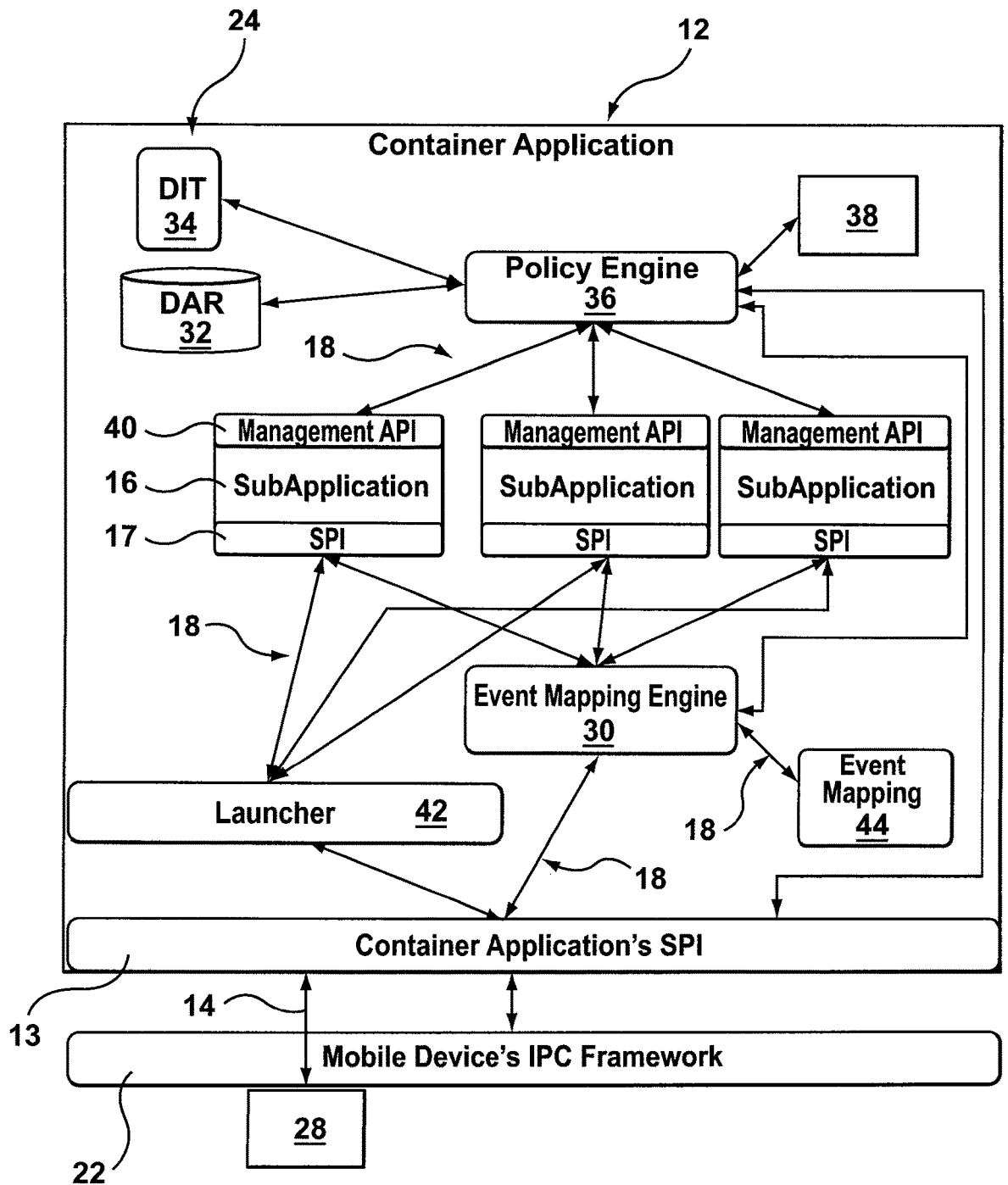
FIG. 3 shows an example configuration of a container application of the device of FIG. 1.

Referring to FIG. 3, a Data At Rest component 32 and a Data in Transit component 34 can be stored on or otherwise accessed with respect to the storage 24. In the example embodiment shown in FIG. 3, components 34 and 32 (DAR and DIT) are associated with the container application 12 and are accessible by the respective containerized applications 16 associated with the container applications 12. For example, the components 34 can be a (e.g. JAVA) library implementation that is shared across containerized applications 16 within a container application 12, and as such the library associated with the components 34 can be owned by the respective container application 12 hosting the containerized applications 16. Further, component 32 may be a physical file system stored in memory 24 and virtualized such that each containerized application 16 "sees" the single file system as individual file systems pertaining to each respective containerized application 16 and associated with and accessible by the respective host container application 12. According to this example architecture utilizing a library implementation with virtualized file systems, a so called policy Engine 36 (described in more detail below) contained in the host container application 12 can bypass the data management of components 34,32 (e.g. to execute a wipe data command, or a lock data command, etc.) without going through the containerized applications 16.

The library implementation discussed above can be defined as a set of dynamically loadable libraries (e.g. JAVA Class Library (JCL)) which may be called by the containerized applications 16 at run time. In terms of the JAVA example, because the JAVA Platform is not dependent on a specific operating system, the containerized applications 16 may not rely on any of the platform-native libraries. Instead, the library implementation (e.g. JAVA Platform) can provide a comprehensive set of standard class libraries, containing the data access functions common to modem operating systems. The standard code libraries implementation (as an embodiment of the containerized applications 16), provides to the containerized applications 16 access to data components 32, 34. In this manner, the library implementation provides an abstract data management interface for data manipulation, such as file access in the memory 22. Dynamic linking or late binding of the libraries can refer to linking performed while a containerized application 16 is being loaded (load time) or executed (run time) via the host container application 12, rather than when an executable library file associated with the containerized application 16 is created. A dynamically linked library (dynamic-link library or DLL under WINDOWS and OS/2; dynamic shared object or DSO under Unix-like systems) is a library intended for dynamic linking.

Communications pathways 14, 18 (i.e. electronic pathways physically and/or logically defined) can be implemented on one or more configured communication buses of the device infrastructure 22. For example, a communication bus can be defined as a communication system that transfers data (e.g. communication request-and-response pairs) between components (e.g. hardware components 15, 28, software components 12, 16, etc.) inside the computer device 10. This expression can include all related hardware components (wire, circuits, etc.) and software, including communication protocol. The communication bus may encompass any physical arrangement that provides the same logical functionality as a parallel electrical bus, such as buses using parallel and/or bit serial connections, wired in either a multi-drop (electrical parallel) or daisy chain topology, or connected by switched connections (e.g. USB). For example, a communication bus connecting the CPU and memory 24 can be one of the defining characteristics of the system, and referred to simply as the system bus. The internal bus, also known as internal data bus, memory bus, system bus or front-side bus, connects all the internal components of the computer device infrastructure 22, such as CPU and memory 24, to the motherboard. Internal data buses are also referred to as local busses because they are intended to connect to local on-board devices. These busses are typically faster than traditional buses in terms of data transfer rates. Another type of bus may be a cache provided to accommodate a performance difference between the CPU and main memory. In this manner, the cache functions as a bus which provides high-speed memory directly to the CPU.

Further, to provide modularity, memory and I/O buses can be combined into a unified system bus. In this case, mechanical and electrical pathways 14, 18 can be used to connect together some or all of the components/applications of the computer device 10. As such, communication signals between components (e.g. user interface 28, memory 24, etc.) and/or between components and applications 12 (e.g. between application 12 and user interface 28, between application 12 and network interface 15, etc.) are facilitated by pathways 14, 18 which are provided logically or physically by the one or more buses.

Further, communications on pathways 18 behind the service programming interface 13 involving data (e.g. DAR, DIT) can be encrypted when communicated between containerized applications 16. However, preferably, communications (e.g. communication request-and-response pairs) on pathways 18 behind (internal to) the service programming interface 13 involving data (DAR, DIT) can be unencrypted (i.e. plaintext) when communicated between containerized applications 16, thus providing for processor speed efficiencies and overhead as compared to encrypted data. For example, communications between containerized applications 16 using first interface portions 17a may be transmitted in unencrypted form.

In terms of communications (e.g. communication request-and response pairs) on pathways 14 outside of (external to) the service programming interface 13, involving data (e.g. DAR, DIT), these can be encrypted when communicated between container applications 12 and/or between container applications 12 and on-board devices (e.g. user interface 28). For example, while communications between containerized applications 16 and container application 12 using second interface portions 17b and service programming interface 13 may be transmitted in unencrypted form, as received by or otherwise transmitted from the service programming interface 13 with respect to the using second interface portions 17b of the containerized applications 16, any communications received by the service programming interface 13 via pathways 14 may be in encrypted form and subsequently decrypted before being retransmitted to one or more of the containerized applications 16 using second interface portions 17b and service programming interface 13. Further, any communications received by the service programming interface 13 via pathways 18 (originating from second interface portion 17b of the containerized applications 16) may be in unencrypted form and subsequently encrypted before being retransmitted to a target container application and/or on-board devices using service programming interface 13 on pathways 14 of the device infrastructure 22.

In terms of cryptography, encryption can be performed by the container application 12 (e.g. via service programming interface 13) by encoding messages (or information) of the communications using techniques as are known in the art. For example the communications discussed above may be encrypted in such a way that access to the communications is restricted to authorized application and/or components of the computer device, and unauthorized applications and/or components (e.g. a personal unsecured application 20 external to the service programming interface 13 of the container applications 12) do not have access. In an encryption scheme, the message or information of the communication (e.g. referred to as plaintext) is encrypted using an encryption algorithm, turning it into an unreadable cipher text. This encryption process can be performed with the use of an encryption key, which is used to encrypt the message/data. Any unauthorized application or component that can see/access the cipher text via the device infrastructure 22 and outside of the service programming interface 13 will be unable to determine anything about the original message/data. An authorized application/device using the device infrastructure 22, however, is able to decode the cipher text using a decryption algorithm, that usually requires a secret decryption key, that unauthorized application/device do not have access to. The encryption/decryption scheme can use a key-generation algorithm to randomly produce the keys. For example, there are two basic types of encryption schemes: symmetric-key and public-key encryption. In symmetric-key schemes, the encryption and decryption keys are the same. Thus communicating applications/devices using the device infrastructure 22 agree on a secret key before they wish to communicate. In public-key schemes, the encryption key is published for any applications/devices using the device infrastructure 22 to use and encrypt messages. However, only the receiving party has access to the decryption key and is capable of reading the encrypted messages.

Example Service Programming Interface (SPI) Configuration

Service programming interfaces 13, 17 can be defined as enabling an application (e.g. container application 12, containerized application 16) to make some and/or all of its functionality available to other applications resident on the computer device 10, for example as expressed by methods for message passing, synchronization, shared memory, and/or remote procedure calls (RPC) between applications 12, 16, and/or between applications 12 and on-board devices (e.g. user interface 28). In this context, the service programming interfaces 13, 17 may more broadly be considered as communications interfaces which expose underlying functionality and/or services associated with the respective applications 12, 16. This functionality needs to be accessible to various types of applications, so interoperability is a key aspect of the configuration of the service programming interfaces 13, 17. In addition to interoperability, service programming interfaces 13, 17 can also support different types of communications protocols (with or without encryption schemes dependent on data type, location and/or target application/device) and accommodate varying operational requirements. As such, the service programming interfaces 13, 17 can be defined as part of the application 12, 16 that makes pieces of the application's functionality available to other applications, while ensuring that the interface mechanics are decoupled from the application logic.

For example, the service programming interfaces 13, 17 can impose different operational requirements for communications directed to and/or received by different applications. For example, the application 12, 16 may have security requirements that authorize certain applications 12, 16 to perform update and delete operations, while other applications 12, 16 are only authorized to perform read-only operations. Or, for example, different applications 12, 16 may need differing transactional support for communications to or from the service programming interfaces 13, 17. To some application clients 12, 16, the context in which specific transactions occur may not be important while other application clients may need precise control of the transactional context of the communication(s). A handle to this context might then be passed to other elements of the application as needed.

As such, the service programming interface 13, 17 can be defined as a discrete unit of application logic that exposes a message-based interface that is suitable for being accessed by other applications, such that the service programming interface 13, 17 presents the functionality of the container application 12 and/or containerized applications 16 to other consumer/client applications. This service programming interface 13, 17 defines and implements a protocol for communicating between (an) application(s) that consume(s) service/data provided by a provider application 12, 16 of the service/data involved in the communication(s) on the pathways 14, 18.

As discussed above, the service programming interface 13, 17 provides an entry point that consumer applications 12, 16 can use to access the functionality exposed by the provider application 12, 16. The service programming interface 13, 17 can usually be addressable on the respective pathways 14, 18 provided by the device infrastructure 22 of the computer device 10, i.e. those pathways 14 outside of service programming interface 13 and those pathways inside of a respective service programming interface 13. This means that the service programming interface 13, 17 is capable of being accessed by the consumer applications 12, 16 over some sort of device BUS and/or memory sharing/addressing scheme.

One aspect of the service programming interface 13, 17 is to decouple the implementation needed to communicate with other consumer applications from the underlying functionality of a given container 12 and containerized application 16. The service programming interface 13, 17 provides a more coarse-grained communication interface while preserving the semantics and finer granularity of the application logic. The service programming interface 13, 17 also provides a barrier that enables the application's underlying functionality to change without affecting the functionality of applications that consume services of e.g. a given container 12 and containerized application 16. As described above the service programming interface 13, 17 implements a protocol that controls communications between applications that consume services of e.g. a given container 12 and containerized application 16 and the given container 12 and containerized application 16. This contract allows different container applications and/or containerized applications to exchange information even if they are on different systems (e.g. inside or outside of a particular container's service programming interface 13). The service programming interface 13, 17 can also be configured for all of the implementation details needed to perform this communication. Such details include but are not limited to bus protocol. The service programming interface 13, 17 could encapsulate all aspects of the bus protocol used for communication between an application requesting services from a given container application 12 and/or corresponding containerized applications 16 and the given container application 12 and/or corresponding containerized applications 16. For example, suppose that a particular service application 12, 16 is exposed to a consumer application through pathways 14, 18. The service programming interface 13, 17 of the service application 12, 16 receives a request communication, extracts the information needed by the service application 12, 16 to process the request, invokes the appropriate service application 12, 16 functionality, packages the service application 12, 16 response, and sends the response back to the consumer application as a response communication over the appropriate pathway 14, 18. From the service perspective, the only component that interacts with the bus is the service programming interface 13, 17. The service application 12, 16 implementation has its own means of communicating the respective service programming interface 13, 17 and could have no dependencies on the specifics of the parameters (e.g. security controls such as authorized or unauthorized access, etc.) that consumer applications use to communicate with the service programming interface 13, 17.

Further, the service programming interface 13, 17 may translate between consumer application data formats and the data formats that the service application expects. The service programming interface 13, 17 may transform and map both data formats to a format that a particular service application can use. The service application implementation does not need to have any knowledge of the specific data formats the service programming interface 13, 17 might use to communicate with the consumer applications, which may or may not involve their own service programming interface.

Further, the service programming interface 13, 17 can implement security policies on communications that are transmitted via the pathways 14, 18. In this context, the service programming interface 13, 17 may be considered as trust boundaries. Different consumer applications may have different security requirements, which are implemented by the respective service programming interface 13, 17. For example, a consumer application providing communications on pathways 14 external to the service programming interfaces 13 may have more restrictive security requirements than those of a consumer application internal to the service programming interfaces 13 in respect of communications on pathways 18. External consumer application may have strong authentication requirements and only be authorized to perform a very limited subset of the operations available to it. In contrast, internal consumer application can be implicitly trusted for most operations and only require authorization for the most sensitive operations.

Further, the service programming interface 13, 17 may implement caching to increase response time and reduce bandwidth consumption, and may prioritize such performance parameters in accordance with a predefined policy relating to, for example, the identity of the requesting (consuming) application.

IPC Messaging Example Configuration

Figure 2:
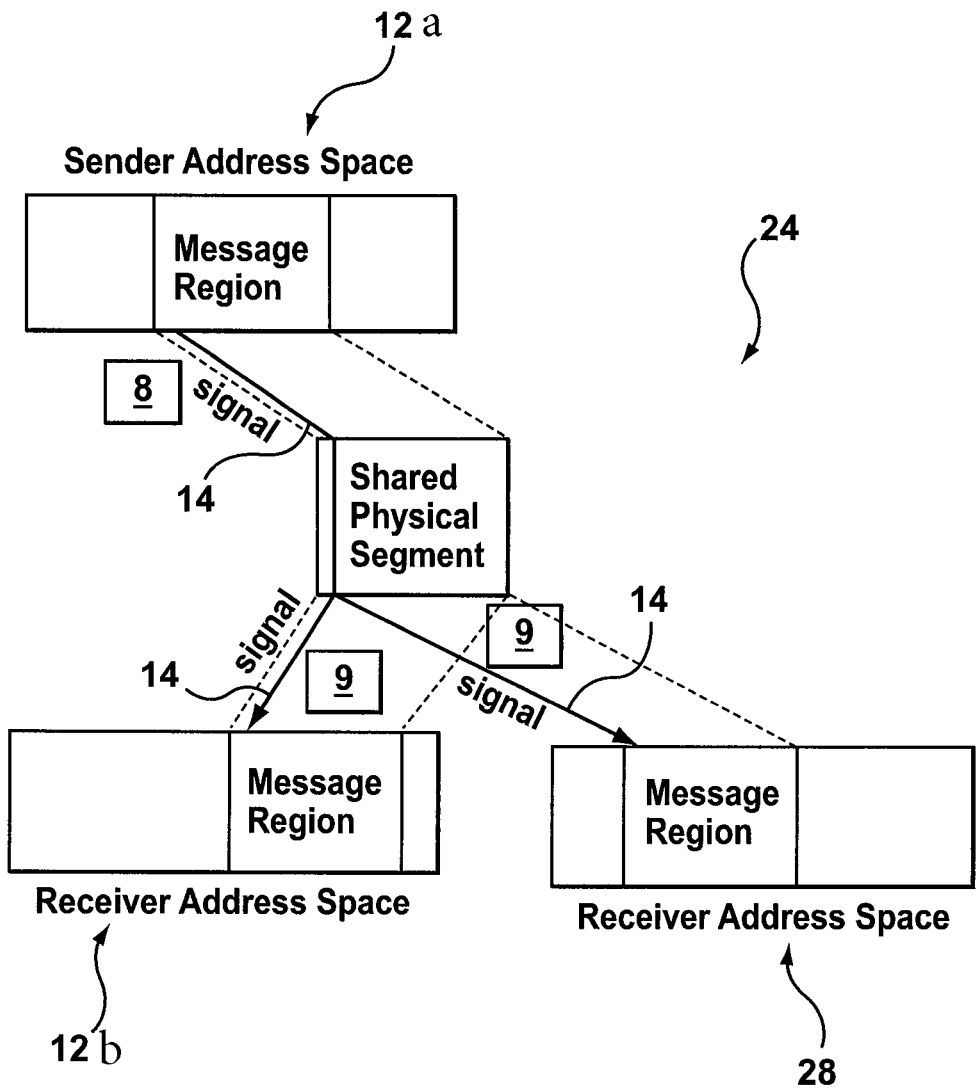
FIG. 2 shows an example configuration of IPC communication of the device of FIG. 1.

FIG. 2 shows an example IPC setup for providing inter process (for individual container applications 12a, 12b with one another, other provisioned applications on the device infrastructure 22, and other on-board devices—e.g. memory 24, peripherals of network interface 15, user interface 28, etc.) and hardware device communication as a caching model. In this example, the IPC framework is implemented as an extension of the virtual memory system of the device infrastructure 22 using memory-based messaging via the pathways 14. It is also recognized that the IPC setup for providing inter process and hardware device communication can also be used by applications provisioned on the computer device infrastructure 22, other than the container applications 12a, 12b and respective containerized applications. With memory-based messaging, threads 8, 9 (e.g. messages involving transfer of data between containers 12a, 12b and/or between containers and other on-board devices such as the user interface 28) connected with container applications 12a, 12b communicate through the memory system 24 via pathways 14 by mapping a shared region of physical memory of the memory system 24 into the sender and receiver address spaces of the memory system 24.

In operation, the sending thread 8 writes a message into this shared region and then delivers the address of the new message to the receiving threads 9 as an address-valued signal. That is, the virtual address corresponding to the location of the new message is passed to the signal function of the receiving thread 9, translated from the virtual address of the sending thread 8 (e.g. using a normal inverted page table support). On receiving the address-valued signal, the receiving thread 9 reads the message at the designated location in the virtual memory region. While the receiving thread 9 is running in its signal function, additional signals are queued within the cache (e.g. memory stack of queue such as FIFO). In other words, sending thread 8 provides for the transmission of a packet with the signal address indicating the packet buffer to transmit. On reception, a signal is generated to the receiving thread 9 with the signal address indicating the buffer holding the new packet. The receiving thread 9 can demultiplex the data to the appropriate input stream for the target application, which may be a containerized application 16 (not shown in FIG. 2).

To support memory-based messaging, messaging can be used to optionally specify a signal thread and also to specify that communication is in message mode. An application 12a interested in receiving signals from a given application 12b (or on-board device) specifies a signal thread 9 in the mapping between applications 12a, 12b, devices 15, 28, etc. (see FIG. 1). The signaling can use the same mapping data structures as the rest of the virtual memory system. As such, data transfer aspects of inter process communication (IPC) on the pathways 14 can be performed directly through the memory system 24, and thus is independent and separate from the data transfer (and other communication types) implemented on the pathways 18 for containerized applications 16 that reside behind the service programming interface 13 of a given container application 12a. It is recognized that communications on the pathways 14 which are performed with respect to the memory system 24 also made available to all other applications and other devices of the device infrastructure 22 (e.g. devices 15, 28). In contrast, these communications are, by definition, not made directly available to the containerized applications 16 which instead use pathways 18 via the dedicated first interface portion 17a. Examples of communication for threads 8, 9 on pathways 14 can include data processing functions such as but not limited to copying, queuing and delivering messages.

It is also recognized that the threads 8, 9 could be used to implement object-oriented RPCs (Remote Procedural Calls) via the communication interfaces 13 to services via the pathways 14. For instance, an object writeback can use a writeback channel implementing the threads 8, 9 discussed above. This RPC implementation provides applications with control over communication resource management and exception handling, by, for example, overriding functions in the communication library available via the pathways 14 of the device infrastructure 22 that are external to the service programming interface 13. As such, it is recognized that the communications between containerized applications 16 use the service programming interfaces 17 that are configured as internal to the service programming interface 13. Thus any communications via the service programming interfaces 17 (e.g. via second interface portion 17b), directed to outside of the container environment provided by the respective container application 12a, must be received and then retransmitted by the service programming interface 13 of the respective container application 12a before being transmitted on the pathways 14 of the device infrastructure 22. Further, any communications 6 originating from the environment outside of the container application 12a, for example the user interface 28 to be received via the service programming interfaces 17 (e.g. via second interface portion 17b), may be received on pathways 14 of the device infrastructure 22 and then retransmitted by the service programming interface 13 of the respective container application 16 before being transmitted via the pathways 18 that reside internal to the service programming interface 13 (i.e. within the container application 12a environment.

As discussed above in the context of regular IPC communication on pathways 14 outside of a given container application 12a, communications directly between containerized applications on pathways 18 are considered to be defined as behind or inside of the service programming interface 13 of the container application 12a. This contrasts with communication on pathways 14 outside of the given container application 12a (e.g. between container applications 12a, 12b and/or between container applications 12a, 12b and other on-board devices 15, 28 via the bus of device infrastructure 22), which are considered to be defined as in-front of or external to the service programming interface 13.

In general, inter-process communications on pathways 14 can be defined as a set of methods for the exchange of data among multiple threads in one or more processes. Processes may be running on the device infrastructure 22. IPC methods can be divided into methods for message passing, synchronization, shared memory, and remote procedure calls. The specific method of IPC used can vary based on the bandwidth and latency of communication between the threads, and the type of data being communicated. There can be several reasons for providing an environment that allows process cooperation on the pathways 14, such as information sharing, computational speedup, modularity, convenience, and/or privilege separation.

Examples of IPC methods can include, as implemented by the operating system of the device infrastructure 22: (i) file—a record stored on memory 24 that can be accessed by name by any process; (ii) signal—a system message sent from one process to another, not usually used to store information but instead give commands; (iii) socket—a data stream sent/received with respect a network interface 15, either to a different process on the same computer device 10 or to another computer via the network 11; (iv) message queue—an anonymous data stream similar to a pipe, but stores and retrieves information in packets; (v) pipe—a two-way data stream interfaced through standard input and output and is read character by character; (vi) named pipe—a pipe implemented through a file on the file system instead of standard input and output; (vii) semaphore—a simple structure that synchronizes threads or processes acting on shared resources; (viii) shared memory—multiple processes given access to the same memory address 24, allowing all processes involved to change it and read changes made by other processes; (ix) message passing (shared nothing)—similar to the message; and/or (x) memory-mapped file—a file mapped to RAM memory 24 and can be modified by changing memory addresses directly instead of outputting to a stream, shares same benefits as a standard file.

Example Container Application 12 Configuration

Referring to FIGS. 1 and 3, as discussed above, provided is a system and method to manage a subset of containerized applications 16 on the mobile device 10 without the need for IPC (i.e. providing for bypassing of using pathways 14 while at the same time providing for containerized application 16 inter-communication via pathways 18). This system provides for the container application 12 (for example as part of a mobile application management (MAM) system) implemented on the mobile device infrastructure 22 to manage the containerized applications 16 without the need for IPC communication on the pathways 14. It further allows for selectively exposing a subset service programming interface 17 for each containerized application 16, defined by a set of prescribed policies, such that the containerized applications 16 can function in a secured state (e.g. secure enterprise environment) while operating according to enforced policies. In one arrangement, the container application 12 and associated components (e.g. containerized applications 16, policy engine 36, mapping engine 30 and/or launcher 42) can be provisioned on the device infrastructure 22 in memory 24 as one address space. The provision of one address space can also be referred to as a sandbox. The term "sandbox" can also be applied in computing as an indefinite isolation area of the memory 24 (e.g. directory path).

Referring to FIG. 3, shown is an example of the container application 12 (a mobile device application provisioned in the computing device 10) including a policy engine 36, one or more associated containerized applications 16 (e.g. sub-applications referring to a self-contained mobile application that is be placed under the direct control of the container application 12 policies 38), an event transformation or mapping engine 30 and a service programming interface 13. As such, the service programming interfaces 17 of the containerized applications 16 are directly coupled to the service programming interface 13 and therefore indirectly coupled to the IPC framework via the service programming interface 13 of the host container application 16. As such, the container application 12 controls access and/or content of communications between the IPC framework and the service programming interfaces 17. The container application 12 can be considered a mobile application management (MAM) component provisioned on the device infrastructure 22 and can consist of, depending on the particular mobile application platform 22 configuration, one or more DAR components 32, one or more DIT components 34 stored on or with respect to the storage 24; a policy engine 36 configured as a component of the container application 12 that applies application management policies 38 to the containerized applications 16 using a set of management APIs 40. The policy engine 36 can accept commands from a remote mobile device management (MDM) server (not shown) via the network interface 15 (of the device infrastructure 22) in communication with the service programming interface 13. In terms of the management APIs 40, these are a communication interface defined between the containerized applications 16 and the policy engine 36, such that the policy engine 36 can implement selected policies 38 via direct invocation of one or more methods recognized by the management APIs 40.

As such, the set of management API's 40 implemented by each containerized application 16 provides means for the policy engine 36 to control the behavior of the containerized applications 16. Preferably the management API 40 is separate from and therefore not implemented via IPC pathways 14. For example in one arrangement the management API 40 sits behind the service programming interface 13 of the container application 12 and is preferably configured to communicate directly with the policy engine 36. In other words, any process/application communication with the management API 40 of the container application 12, from applications or processes located outside of the service programming interface 13 must first communicate with the service programming interface 13, which receives the communication from the external application/process (via pathway 14) and then retransmits the communication inside of the service programming interface 13 using pathway(s) 18 to the policy engine 36 and/or to the management API 40. Alternatively, the service programming interface 13 can retransmit the communication to the event mapping engine 30 which then communicates the communication to the policy engine 36 and/or management API 40.

Alternatively, the management API 40 can sit adjacent to the service programming interface 17 of the container application 16 and can be configured to communicate directly with the policy engine 36. The management API 40 is not exposed via service programming interface 17, and as such is not accessible via pathways 18 (and thus 14). As a result, only the Policy Engine 36 can access the management API 40 exposed within the host container application 12.

In one example embodiment, for the ANDROID™ platform developed by GOOGLE Inc. of Mountain View, Calif., United States, the management API 40 can be expressed as a set of JAVA interfaces 40 which the policy engine 36 is able to invoke directly via a JAVA method call. In this example, the container application 12 also contains a Launcher 42 providing a user interface (UI) functionality to the container application 12 and allows the user of the mobile device 10 to launch containerized applications 16 via a user interface. The launcher 42 is exposed via the service programming interface 13 of the container application 12 and therefore is positioned behind the service programming interface 13 and, as such, is accessible via the pathways 18. This provides a means of ensuring that only external applications/processes (i.e. those outside of the service programming interface 13) that are authorized to communicate with the service programming interface 13 can launch any of the target containerized applications 16 located behind the service programming interface 13.

Referring again to FIG. 3, the event mapping engine 30 is positioned behind the service programming interface 13 and thus only accessible by communications on pathways 18 and selectively exposes service programming interfaces 17 of containerized applications 16 based on a set of event mappings 44. For example, in one embodiment on the ANDROID platform, an onCreate( ) SPI 17 can be exposed to the IPC framework 22 to control the creation and initialization of the respective service of the containerized application 16. The policy engine 36 may apply a policy 38 according to which the containerized application 16 services are not to be created or initialized, until the user provides the proper credentials. This policy 38 can be expressed as an event mapping 44 of the form: ContainerApplication.unLock( ) R-Service.onCreate( ), which has the meaning "ContainerApplication.unLock( ) has to occur before Sevice.onCreate( ) happens". In further examples, the event mapping engine 30 may act as a control component of the container application 12 to permit or deny communications between the containerized applications on the basis of one or more policies or rules stored in the event mapping 44.

In some embodiments the notion of a "sticky" method invocation can be introduced, denoted by the superscript sticky, to account for situations where the method invocation violates the temporal logic rule of the event mapping 44 in which case the method invocation will be queued until such time that the temporal logic rule is no longer violated and the method invocation can be restored. For example, a call to Service.onCreate( ) could be intercepted if ContainerApplication.unLock( ) is false. In this case, i.e. if Service.onCreate( ) is sticky, the intercepted call can be resumed once ContainerApplication.unLock( ) becomes true. It is recognized as an alternative that the expression of a "sticky" property can also be performed using logic.

In further embodiments based on the ANDROID platform, the event mapping engine 30 can enforce a mapping rule 44 by: (i) intercepting the call communication (e.g. Service.onCreate( )) invoked by the ANDROID platform via byte-code manipulation of the service programming interface 13; (ii) registering a listener to the ContainerApplication.unLock( ) event and the ContainerApplication.onCreate( ) event on behalf of the containerized application 16; and (iii) upon receiving the two events resume the Service.onCreate( ) invocation. As such, it is recognized in general that event mapping 44 rules can be expressed as a variant of temporal logic that are consumed by the event transformation engine 30 to implement a policy 38 as directed by the policy engine 36.

Further to the above, in one embodiment based on the ANDROID platform, the set of containerized applications 16 are associated with a given container application 12 by defining metadata used to represent the containerized applications 16 as library projects of the host container application 12. An ANDROID library project has all the components of a regular ANDROID project (e.g. source code, resources, a manifest file etc.), except a regular ANDROID project can establish a dependency on a library project by referencing the library project. The consequence of declaring this dependency between the library project and the application 16, is that the regular ANDROID project, along with all library projects on which it depends, are compiled into a single ANDROID APK and is treated as a monolithic application by the ANDROID operating system at run-time. Further, a manifests of the containerized applications 16 can be merged with the manifest of the container application 12, thus changing the "exported" attribute for activities, providers, services and receivers to false. This can provide for the establishment of the service programming interface 13 to operate as a virtual firewall between the containerized application 16 and the rest of the operating system (e.g. IPC framework 22). As discussed above, it is noted that the containerized application 16 can still communicate with each other using pathways 18 (e.g. via (but not limited to) ANDROID binder) because they are hosted inside the container application 16 (i.e. all are behind the service programming interface 13). It is also noted that pathway 18 can include direct (e.g. JAVA) method invocations, as desired.

The manifest of an application 12, 16 (e.g. an ANDROID-Manifest.xml file located in the project root directory) presents information about the application to the operating system, information the operating system uses in order to execute the application 12, 16. Among other things, the manifest can provide any/all of the following: (i) it names the (e.g. JAVA) package for the application such that the package name serves as a unique identifier for the application; (ii) it describes the components of the application, such as the activities, services, broadcast receivers, and content providers that the application is composed of; (iii) it names the parameters (e.g. classes) that implement each of the components and publishes their capabilities (for example, which intent messages they can handle), for example these declarations can let the operating system (e.g. Android) know what the components are and under what conditions they can be launched; (iv) details of which processes will host application components; (v) declarations of which permissions the application must have in order to access protected parts of the SPI/API and interact with other applications; (vi) also declares the permissions that others are required to have in order to interact with the application's components; (vii) it lists the instrumentation classes that provide profiling and other information as the application is running, whereby these declarations are present in the manifest only while the application is being developed and tested; they're removed before the application is published; (viii) it declares the minimum level of the operating system API that the application uses; (ix) and it lists the libraries that the application is linked against. Further, the main activity (e.g. characterizing service) of each containerized application 16 is registered with the launcher 42, such that the launcher 42 can recognize and access the appropriate containerized application 16 upon invocation (or access request) resulting from communications coming from outside of the service programming interface 13 with a target as the respective containerized application 16. Further, based on the policies 38 that are to be applied to the containerized application(s) 16, a set of event mappings 44 is defined and expressed in a variation of temporal logic, to expose the subset SPIs 17 of the containerized application(s) 16 to the outside world (i.e. applications/processes located external to the SPI 13. For example, the policy "Service.onCreate( ) can't be invoked until container application 12 is unlocked. Upon which, Service.onCreate( ) that was suspended will be resumed" translates to ContainerApplication.unLock( ) R-Service.onCreate( ) ticky, as introduced above by example. Further, exposed is the subset SPI 17 of the containerized application(s) 16, as identified in the launcher 42 via the container application's 12 manifest.

Exemplary Configuration

Referring back to FIG. 1, device 10 can be embodied as a mobile device; a smart phone, a wireless phone; a PDA, a tablet, and/or a desktop computer. Accordingly, the computing device 10 can be connected to the network 11 via a wireless (WiFi or cellular) connection. Alternatively, the computing device 10 can be connected to the network 11 via a wired connection.

Preferably, the communications network 11 comprises a wide area network such as the Internet, however the network 11 may also comprise one or more local area networks 11, one or more further wide area networks, or a combination thereof. Further, the network 11 need not be a land-based network, but instead may comprise a wireless network and/or a hybrid of a land-based network and a wireless network for enhanced communications flexibility. The communications network 11 is used to facilitate network interaction between the devices 10 and the servers (not shown).

Referring again to FIG. 1, shown is an example device infrastructure 22 including the network connection interface 15, such as a network interface card (e.g. SIM) or a modem. The network connection interface 15 is connectable during operation of the device 10 to the network 11 (e.g. an intranet and/or an extranet such as the Internet), which enables the device 10 to communicate with each other as appropriate. The network 11 can support the communication of message 29, and the related content.

The device 10 can also have a user interface 28, coupled to the device infrastructure 22, to interact with a user (not shown). The user interface 28 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 22.

As will be appreciated from the foregoing description of exemplary embodiments, operation of the device 10 is facilitated by the device infrastructure 22. The device infrastructure 22 includes one or more computer processors (CPU) and can include associated physical memory 24. The computer processor implements various functionality (e.g. applications 12, 16) by interfacing with the network interface 15, the user interface 28 and other application programs/hardware of the device 10 to execute task related instructions. These task related instructions can be provided by the operating system, and/or software applications located in the memory 24, and/or by operability that is configured into the electronic/digital circuitry of the computer processors designed to perform the specific tasks. Further, it is recognized that the device infrastructure 22 can include a computer readable storage medium coupled to the computer processor for providing instructions to the computer processor and/or to load/update the instructions. The computer readable medium can include hardware and/or software such as, by way of example only, flash memory, optically readable medium such as CD/DVD ROMS, and memory cards. In each case, the computer readable medium may take the form of a small disk, hard disk drive, solid-state memory card, or RAM provided in the memory module 24. It should be noted that the above listed example computer readable mediums can be used either alone or in combination.

Further, it is recognized that the computing device 10 can store executable computer code or machine readable instructions for implementing the applications 12, 16, for example. The computer processor is a configured to execute the machine readable instructions to performing operations as described by example above, including those operations as performed by any or all of the applications 12, 16 and/or an operating system. The computer processor may comprise anyone or combination of hardware, firmware, and/or software. The computer processor acts upon information by manipulating, analyzing, modifying, converting or transmitting information for use by an executable procedure or an information device, and/or by routing the information with respect to an output device. The computer processor may use or comprise the capabilities of a controller or microprocessor, for example. Accordingly, any of the functionality of the modules may be implemented in hardware, software or a combination of both. Accordingly, the use of a computer processor as a device and/or as a set of machine readable instructions is referred to generically as a processor/module for sake of simplicity.

In addition to storing data that is accessed and manipulated by e.g. containerized applications 16, storage 24 may function as a buffer, which is a region of memory used to temporarily hold data while it is being moved from one place to another (e.g. between applications/processes of the computer devices 10). Typically, the data is stored in the memory when moving the data between processes within/between one or more on-board devices. It is recognized that storage 24 can be implemented in hardware, software, or a combination thereof.

Further, it will be understood by a person skilled in the art that memory/storage 24 described herein can be embodied as an electromagnetic or optical form for access by the computer processors/modules. There can be two general usages: first, memory is frequently used to mean the devices and data connected to the computer through input/output operations such as disk systems and other forms of storage not including computer memory and other in-computer storage such as flash memory. Second, in a more formal usage, memory/storage 24 has been divided into: (i) primary storage, which holds data in memory (sometimes called random access memory or RAM) and other "built-in" devices such as the computer processor's L1 cache, and (ii) secondary storage, which holds data on disks, and other devices requiring input/output operations. Primary storage can be faster to access than secondary storage because of the proximity of the storage to the processor or because of the nature of the storage medium on which data is stored. On the other hand, secondary storage can typically hold much more data than primary storage. In addition to RAM, primary storage includes read-only memory (ROM), flash memory, and L1 and L2 cache memory.

Memory/storage 24 can also be defined as a physical electronic holding place for instructions and data for use by the computer processor. When the computer device 10 is in normal operation, its memory usually contains the main parts of the operating system and some or all of the application programs and related data that are being used. Memory is often used as a shorter synonym for random access memory (RAM) and/or flash memory. This kind of memory can be located on one or more microchips that are physically close to the microprocessor in the computer.

What is claimed is:

1. A method of managing access to a plurality of applications capable of executing within a container provisioned on a computing device, the method comprising the steps of:

receiving, at a first communications interface of the container, a first communication for execution by a first application in the plurality of applications capable of executing within the container, wherein the first communication is received from an on-device process via a first communication pathway using an inter-process communication framework provided by an operating system executing on the computing device, wherein the first communications interface is configured to facilitate communications between the container and on-device processes that are external to the container;

sending, from the first communications interface of the container, the first communication to a second communications interface of the first application via a second communication pathway provided by the container, wherein the second communication pathway bypasses the inter-process communication framework, wherein the second communications interface of the first application comprises a first portion and a second portion, the first portion being configured to facilitate communications between the first application and the first communications interface of the container, and the second portion being configured to facilitate communications between the first application and a respective communications interface of a second application executing within the container, wherein the respective communications interface of the second application comprises a third portion and a fourth portion, the third portion being configured to facilitate communications between the second application and the container, and the fourth portion being configured to facilitate communications between the second application and the first application, wherein the second portion and the fourth portion are configured to translate application data formats between the first application and the second application within the container;

receiving, at the first communications interface of the container, a response to the first communication from the second communications interface of the first application via the second communication pathway; and sending the response from the first communications interface of the container to the on-device process via the first communication pathway.

2. The method of claim 1, further comprising the steps of:
receiving, at the first communications interface of the container, a second communication for the first application via the first communication pathway; and denying access to the first application by preventing receipt of the second communication by the second communications interface of the first application.

3. The method of claim 1, further comprising the steps of:
using the first portion of the second communications interface of the first application to receive the first communication via the second communication pathway; and using the second portion of the second communications interface of the first application to communicate with the second application in the plurality of applications capable of executing within the container via the second communication pathway.

4. The method of claim 1, further comprising the steps of:
receiving, at the first communications interface of the container, a control communication via the first communication pathway;

sending the control communication from the first communications interface of the container to a policy engine component of the container via the second communication pathway; and sending a control command from the policy engine component of the container to the first application via the second communication pathway, wherein the control command is based on the control communication received by the policy engine and is configured to control execution of the first application.

5. The method of claim 4, wherein the policy engine component of the container is provided by the first communications interface.

6. The method of claim 1, further comprising the steps of:
receiving a launch command at the first communications interface via the first communication pathway, wherein the launch command is a command to launch a specified service;

sending the launch command from the first communications interface to a launch component of the container via the second communication pathway;

determining, at the launch component, a second application in the plurality of applications capable of executing within the container which is configured to provide the specified service; and sending the launch command to the second application via the second communication pathway.

7. The method of claim 1, wherein the second communication pathway is implemented using a region of memory in a storage device of the computing device, wherein the region of memory is only accessible by the container and the plurality of applications capable of executing within the container.

8. The method of claim 1, wherein the on-device process is an application provisioned on the computing device.

9. The method of claim 1, wherein the on-device process is a process associated with a hardware component of the computing device.

10. The method of claim 9, wherein the hardware component is an external network connection interface of the computing device.

11. The method of claim 1, wherein the first application is configured as a library project of the container.

12. The method of claim 1, wherein the first and second communications interfaces are service programming interfaces.

13. A method of managing access to a plurality of applications capable of executing within a container provisioned on a computing device, the method comprising:

receiving, at a control component of the container, a first communication for a first application in the plurality of applications capable of executing within the container, wherein the first communication is received via a first communications pathway implemented by the container, wherein the first communication is received by the container at a first communications interface of the container;

determining, at the control component of the container, and based on an event mapping, whether the first communication relates to a permitted event in respect of the first application; and transmitting the first communication from the control component to the first application over a second communication pathway implemented by the container when it is determined that the first communication relates to a permitted event in respect of the first application, wherein the first communication is received by the first application at a second communications interface of the first application, wherein the second communications interface of the first application comprises a first portion and a second portion, the first portion being configured to facilitate communications between the first application and the first communications interface of the container, and the second portion being configured to facilitate communications between the first application and a respective communications interface of a second application executing within the container, wherein the respective communications interface of the second application comprises a third portion and a fourth portion, the third portion being configured to facilitate communications between the second application and the container, and the fourth portion being configured to facilitate communications between the second application and the first application; wherein the second portion and the fourth portion are configured to translate application data formats between the first application and the second application within the container.

14. The method of claim 13, wherein the first communication is received at the control component from a second application in the plurality of applications executable within the container.

15. The method of claim 13, wherein the first communication is received at the control component from the first communications interface associated with the container, wherein the first communications interface is configured to interface with an inter-process communications framework provided by an operating system executing on the computing device.

16. The method of claim 13, wherein the first communications pathway and the second communications pathway is implemented using a region of protected memory in a storage device of the computing device which is allocated to the container by an operating system running on the computing device.

17. A non-transitory computer-readable storage medium comprising computer-executable instructions which, when executed by a processor, cause a computing device to perform operations of managing access to a plurality of applications capable of executing within a container provisioned on a computing device, the operations comprising:

receiving, at a first communications interface of the container, a first communication for execution by a first application in the plurality of applications capable of executing within the container, wherein the first communication is received from an on-device process via a first communication pathway using an inter-process communication framework provided by an operating system executing on the computing device, wherein the first communications interface is configured to facilitate communications between the container and on-device processes that are external to the container;

sending, from the first communications interface of the container, the first communication to a second communications interface of the first application via a second communication pathway provided by the container, wherein the second communication pathway bypasses the inter-process communication framework, wherein the second communications interface of the first application comprises a first portion and a second portion, the first portion being configured to facilitate communications between the first application and the first communications interface of the container, and the second portion being configured to facilitate communications between the first application and a respective communications interface of a second application executing within the container, wherein the respective communications interface of the second application comprises a third portion and a fourth portion, the third portion being configured to facilitate communications between the second application and the container, and the fourth portion being configured to facilitate communications between the second application and the first application, wherein the second portion and the fourth portion are configured to translate application data formats between the first application and the second application within the container;

receiving, at the first communications interface of the container, a response to the first communication from the second communications interface of the first application via the second communication pathway; and sending the response from the first communications interface of the container to the on-device process via the first communication pathway.

18. A non-transitory computer-readable storage medium comprising computer-executable instructions which, when executed by a processor, cause a computing device to perform operations managing access to a plurality of applications capable of executing within a container provisioned on a computing device, the operations comprising:

receiving, at a control component of the container, a first communication for a first application in the plurality of applications capable of executing within the container, wherein the first communication is received via a first communications pathway implemented by the container, wherein the first communication is received by the container at a first communications interface of the container;

determining, at the control component of the container, and based on an event mapping, whether the first communication relates to a permitted event in respect of the first application, wherein the first communication is received by the first application at a second communications interface of the first application; and transmitting the first communication from the control component to the first application over a second communication pathway implemented by the container when it is determined that the first communication relates to a permitted event in respect of the first application, wherein the second communications interface of the first application comprises a first portion and a second portion, the first portion being configured to facilitate communications between the first application and the first communications interface of the container, and the second portion being configured to facilitate communications between the first application and a respective communications interface of a second application executing within the container, wherein the respective communications interface of the second application comprises a third portion and a fourth portion, the third portion being configured to facilitate communications between the second application and the container, and the fourth portion being configured to facilitate communications between the second application and the first application, wherein the second portion and the fourth portion are configured to translate application data formats between the first application and the second application within the container.

* * * * *

UNITED STATES PATENT AND TRADEMARK OFFICE
CERTIFICATE OF CORRECTION

PATENT NO. : 10,762,204 B2
APPLICATION NO. : 15/039976
DATED : September 1, 2020
INVENTOR(S) : Yuen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*